United States Patent
Hamada

(10) Patent No.: US 8,541,120 B2
(45) Date of Patent: Sep. 24, 2013

(54) FUEL CELL SYSTEM AND OPERATION METHOD FOR FUEL CELL SYSTEM

(75) Inventor: Kenichi Hamada, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1323 days.

(21) Appl. No.: 12/279,731

(22) PCT Filed: Mar. 16, 2007

(86) PCT No.: PCT/IB2007/000659
§ 371 (c)(1),
(2), (4) Date: Aug. 18, 2008

(87) PCT Pub. No.: WO2007/107836
PCT Pub. Date: Sep. 27, 2007

(65) Prior Publication Data
US 2009/0023020 A1 Jan. 22, 2009

(30) Foreign Application Priority Data
Mar. 22, 2006 (JP) .................................. 2006-078817

(51) Int. Cl.
*H01M 2/38* (2006.01)
(52) U.S. Cl.
USPC .............................................. 429/51; 429/454
(58) Field of Classification Search
USPC .................................................... 429/14, 20
See application file for complete search history.

(56) References Cited

U.S. PATENT DOCUMENTS

| 2004/0106026 A1* | 6/2004 | Fujita et al. ........................ 429/24 |
| 2005/0112424 A1* | 5/2005 | Hirano et al. ...................... 429/20 |
| 2006/0040146 A1* | 2/2006 | Yamaguchi ........................ 429/12 |

FOREIGN PATENT DOCUMENTS

| DE | 10 2004 055728 A1 | 7/2005 |
| EP | 1 275 553 A2 | 1/2003 |
| EP | 1 416 562 A2 | 5/2004 |
| JP | 2003-201834 | 7/2003 |
| JP | 2004-152529 | 5/2004 |
| JP | 2004-172025 | 6/2004 |
| JP | 2005-32502 | 2/2005 |

(Continued)

OTHER PUBLICATIONS

German Office Action issued May 9, 2012 in corresponding Application DE 112007000196.8.

(Continued)

*Primary Examiner* — Kimberly Rizkallah
*Assistant Examiner* — Caleb Henry
(74) *Attorney, Agent, or Firm* — Finnegan, Henderson, Farabow, Garrett & Dunner, LLP

(57) ABSTRACT

A fuel cell system (100) includes: a circulation pump (50) provided on a fuel gas circulation channel (27) so as to circulate a fuel gas; a pump temperature detection portion (420) that detects a temperature of the circulation pump (50); a warmup portion that warms up the circulation pump; a pump control portion (410) that drives the circulation pump; and a breakdown determination portion (450) that determines whether the circulation pump has broken. At the start of the fuel cell system, if the pump temperature detected by the pump temperature detection portion (420) is below the melting point of water, the warmup portion warms the circulation pump, and the pump control portion (410) drives the circulation pump (50). If the pump temperature is higher than or equal to the melting point of water and the rotation speed of the circulation pump (50) is less than a predetermined speed, the breakdown determination portion (450) determines that the circulation pump (50) has broken.

19 Claims, 2 Drawing Sheets

(56) References Cited

FOREIGN PATENT DOCUMENTS

| | | |
|---|---|---|
| JP | 2005-32652 | 2/2005 |
| JP | 2005-050574 | 2/2005 |
| JP | 2006-012656 | 1/2006 |

OTHER PUBLICATIONS

Notification of Reasons(s) for Refusal for Japanese Application No. 2006-078817 issued Nov. 8, 2011.

* cited by examiner

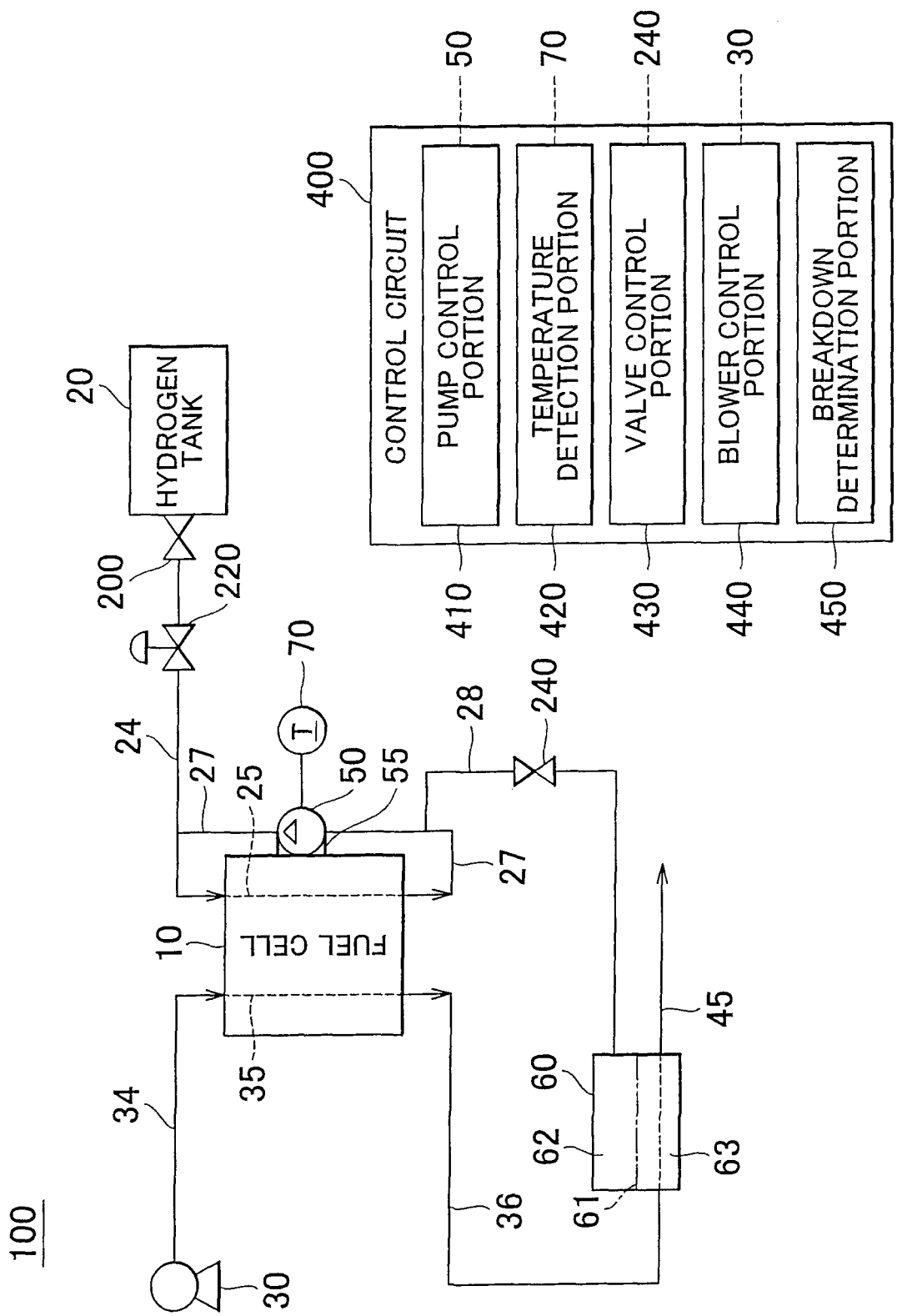

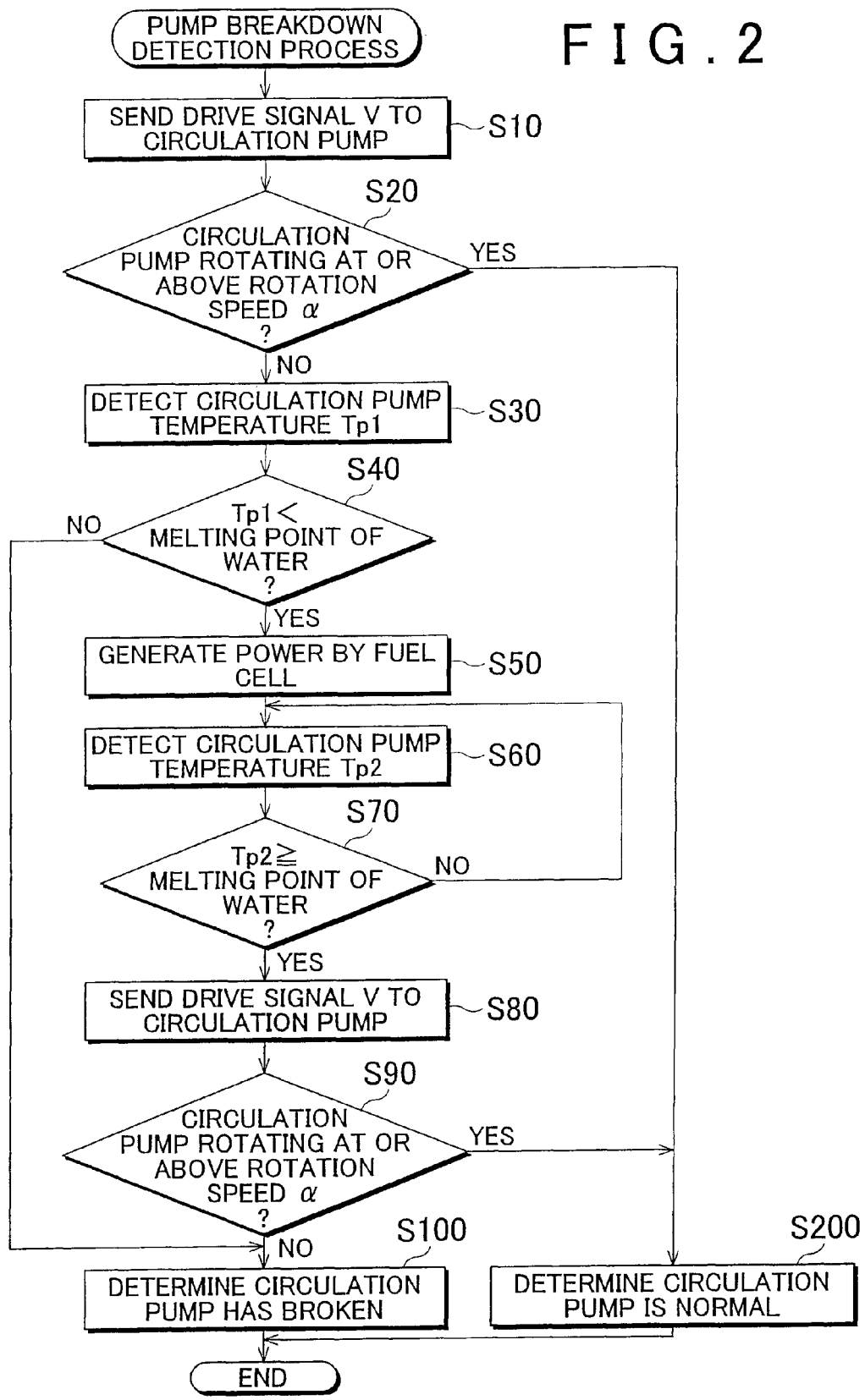

FUEL CELL SYSTEM AND OPERATION METHOD FOR FUEL CELL SYSTEM

CROSS-REFERENCE TO RELATED APPLICATIONS

This application is a national phase application of International Application No. PCT/IB2007/000659, filed Mar. 16, 2007, and claims the priority of Japanese Application No. 2006-078817, filed Mar. 22, 2006, the contents of both of which are incorporated herein by reference.

BACKGROUND OF THE INVENTION

1. Field of the Invention

The invention relates to a fuel cell system, and an operation method for the fuel cell system. Particularly, the invention relates to a failure detection regarding a circulation pump for circulating the fuel gas.

2. Description of the Related Art

In recent years, fuel cell that generates electric power through the use of a fuel gas containing hydrogen and an oxidizing gas containing oxygen are drawing attention. A fuel cell system having such a fuel cell includes a fuel gas supply channel that supplies the fuel gas to the fuel cell, a fuel gas circulation channel that circulates the fuel gas discharged from the fuel cell by returning it to a fuel gas supply channel for reuse, a circulation pump provided on the fuel gas circulation channel so as to circulate the fuel gas, etc. Among these gas channels, the channels in which the fuel gas circulates are called circulation system channels as well.

A fuel cell system as described above, at the time of startup, performs a pump driving detection in which the driving of the circulation pump is attempted and it is detected whether or not the circulation pump is driven (Japanese Patent Application Publication No JP-A-2004-172025). In this pump driving detection, if it is detected that the circulation pump fails to be driven, it is determined that the circulation pump has a breakdown, and a measure, for example, stopping the power generation, is taken.

In the fuel cell, water is produced by an electrochemical reaction during power generation, and the reaction-produced water circulates in a circulation system channel, and sometimes remains in the circulation pump. If, with water remaining, the outside air temperature falls below freezing point and the operation of the fuel cell system is stopped for a certain amount of time, the water remaining in the circulation pump freezes. In that case, there is risk of the circulation pump failing to be driven.

Therefore, if, at the time of starting the fuel cell system, the pump driving detection is performed and the circulation pump fails to be driven, a case is conceivable in which the circulation pump fails to be driven because of the freezing as well as a case where the circulation pump fails to be driven because of a breakdown. Hence, as for the pump driving detection, there is risk of falsely determining that the circulation pump has a breakdown in the case where the circulation pump fails to be driven due to freezing, and actually does not have a breakdown. In consequence, there is risk of bringing about an inconvenience in which the power generation has to be stopped although the circulation pump actually does not have a breakdown.

SUMMARY OF THE INVENTION

It is an object of the invention to provide a technology of accurately determining whether the circulation pump is normal or broken, at the time of start of a fuel cell system.

A fuel cell system in accordance with one aspect of the invention includes: a fuel cell; a fuel gas supply portion; a fuel gas supply channel that supplies a fuel gas from the fuel gas supply portion to the fuel cell; a fuel gas circulation channel that is connected to the fuel cell and to the fuel gas supply channel and that circulates the fuel gas discharged from the fuel cell by returning the fuel gas to the fuel gas supply channel for reuse; a circulation pump provided on the fuel gas circulation channel so as to circulate the fuel gas; a temperature detection portion that detects a temperature of the fuel cell system; a pump control portion that drives the circulation pump; and a breakdown determination portion that determines whether the circulation pump has broken. In the fuel cell system, the pump control portion drives the circulation pump, and the breakdown determination portion determines that the circulation pump has broken if the temperature of the fuel cell system detected by the temperature detection portion is higher than or equal to a melting point of water and a rotation speed of the circulation pump is less than a predetermined rotation speed.

The fuel cell system of this aspect may further include a warmup portion that warms up the circulation pump. When fuel cell system is started, the warmup portion may warm the circulation pump if the temperature of the fuel cell system detected by the temperature detection portion is less than the melting point of water.

According to the fuel cell system constituted as described above, it can be accurately determined whether the circulation pump is normal or is actually broken, even when the circulation pump is frozen.

The fuel cell system of this aspect may further include an oxidizing gas supply portion that supplies an oxidizing gas to the fuel cell. If the temperature of the fuel cell system detected by the temperature detection portion is less than the melting point of water, the warmup portion may cause the fuel gas supply portion and the oxidizing gas supply portion to supply the fuel gas and the oxidizing gas, respectively, to the fuel cell so as to cause the fuel cell to perform power generation so that the circulation pump is warmed by heat produced by the power generation.

Therefore, the circulation pump can be warmed by using devices provided in the fuel cell system, and the number of component parts of the fuel cell system can be minimized.

In the fuel cell system of this aspect, the circulation pump may be disposed near the fuel cell. Furthermore the circulation pump may be disposed integrally with the fuel cell.

Therefore, heat produced in the fuel cell is quickly transferred to the circulation pump, and the circulation pump can be rapidly warmed up.

The fuel cell system of this aspect may further include: a purge channel that discharges the fuel gas to outside the fuel cell system from the fuel gas circulation channel upstream of a position where the circulation pump is provided, in a circulating direction of the fuel gas; a shut-off valve provided on the purge channel; a valve control portion that performs a control of opening and closing the shut-off valve; and an oxidizing gas adjustment portion that adjusts a supply amount of the oxidizing gas supplied by the oxidizing gas supply portion to the fuel cell. The warmup portion, when causing the fuel cell to perform the power generation, may increase an amount of power generation of the fuel cell by causing the valve control portion to open the shut-off valve so as to increase the supply amount of the fuel gas supplied to the fuel cell and causing the oxidizing gas adjustment portion to increase the supply amount of the oxidizing gas corresponding to the supply amount of the fuel gas.

Therefore, the circulation pump can be quickly warmed since the heat produced by the power generation increases as the amount of power generation of the fuel cell is increased.

An operation method for a fuel cell system in accordance with an aspect of the invention is an operation method for a fuel cell system including a fuel cell, a fuel gas supply portion, a fuel gas supply channel that supplies a fuel gas from the fuel gas supply portion to the fuel cell, a fuel gas circulation channel that is connected to the fuel cell and to the fuel gas supply channel and that circulates the fuel gas discharged from the fuel cell by returning the fuel gas to the fuel gas supply channel for reuse, and a circulation pump provided on the fuel gas circulation channel so as to circulate the fuel gas, the operation method including: (A) the step of detecting a temperature of the fuel cell system when the fuel cell system is started; (B) the step of warming the circulation pump and driving the circulation pump if the detected temperature of the fuel cell system is less than a melting point of water; (C) the step of determining that the circulation pump has broken if the temperature of the fuel cell system is higher than or equal to the melting point of water and a rotation speed of the circulation pump is less than a predetermined rotation speed.

According to the operation method for the fuel cell system as described above, it can be accurately determined whether the circulation pump is normal or is actually broken, even when the circulation pump is frozen.

The invention is not limited to the aspects of a device, such as the above-described fuel cell system, an operation method for a fuel cell system, or the like, but can also be carried out in various other aspects, for example, an aspect as a computer program that constructs such methods or devices, or an aspect as a recording medium in which such a computer program is recorded, an aspect as a data signal that includes the computer program and is embodied in a carrier wave, etc.

If the invention is constituted as a computer program, a recording medium in which the program is recorded, or the like, the invention may be provided in a form that includes the entire program that controls the operation of the aforementioned device, or may also be provided in a form that includes only a portion that performs the functions of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a block diagram showing a constitution of a fuel cell system 100 of an embodiment of the invention; and FIG. 2 is a flowchart of a pump breakdown detection process performed by the fuel cell system 100 of the embodiment shown in FIG. 1.

DETAILED DESCRIPTION OF THE PREFERRED EMBODIMENTS

An embodiment of the invention will be described hereinafter in the following procedure.
A. Embodiment:
A1. Constitution of Fuel Cell System:
A2. Pump Breakdown Detection Process:
B. Modifications:

A. Embodiment

A1. Constitution of Fuel Cell System

FIG. 1 is a block diagram showing a constitution of a fuel cell system 100 as an embodiment of the invention. This fuel cell system 100 includes a fuel cell 10, a hydrogen tank 20, a blower 30, a circulation pump 50, a diluter 60, a temperature sensor 70, a hydrogen shut-off valve 200, a pressure regulating valve 220, a gas discharge valve 240, and a control circuit 400.

The fuel cell 10 is a solid polymer type fuel cell, and has a stack structure in which a plurality of unit cells that are constitution units (hereinafter, referred to simply as "cells") are stacked. Each cell has a constitution in which an electrolyte membrane (not shown) is sandwiched between an anode (not shown) and a cathode (not shown). The fuel cell 10 causes electrochemical reactions to progress to produce electromotive force by supplying a hydrogen-containing fuel gas to the anode side of each cell, and supplying an oxygen-containing oxidizing gas to the cathode side of each cell. The fuel cell 10 supplies produced electric power to predetermined loads (e.g., an electric motor, a storage battery) that are connected to the fuel cell 10. As the fuel cell 10, various types of fuel cell besides the aforementioned solid polymer fuel cell may be also be used, for example, a hydrogen separation membrane type fuel cell, an alkaline aqueous solution electrolyte type fuel cell, phosphoric acid electrolyte type fuel cell, a molten carbonate electrolyte type fuel cell, etc. In the following description, a channel in the fuel cell 10 in which the fuel gas flows is referred to as "anode channel 25", and a channel in which the oxidizing gas flows is referred to as "cathode channel 35".

The hydrogen tank 20 is a storage device in which a high-pressure hydrogen gas is stored. The hydrogen tank 20 is connected to the anode channel 25 of the fuel cell 10 via a fuel gas supply channel 24. The hydrogen shut-off valve 200 and the pressure regulating valve 220 are provided on the fuel gas supply channel 24 in that order from the side of the hydrogen tank 20. By opening the hydrogen shut-off valve 200, the hydrogen gas is supplied as a fuel gas to the fuel cell 10. Instead of the hydrogen tank 20, a device that produces hydrogen through a reforming reaction of a raw material, such as alcohol, hydrocarbon, aldehyde, etc., and supplies hydrogen to the anode side may also be employed.

An outlet side of the anode channel 25 and the fuel gas supply channel 24 are connected by a gas circulation channel 27. The circulation pump 50 is provided on the gas circulation channel 27. By driving the circulation pump 50, the fuel gas that has been used in the electrochemical reaction in the anodes of the fuel cell 10 is supplied again to the anode channel 25 (anodes) of the fuel cell 10 via the gas circulation channel 27 and the fuel gas supply channel 24, and thus is re-used for the power generation. Hereinafter, the channel in which the fuel gas circulates, that is, the channel formed by the gas circulation channel 27, the fuel gas supply channel 24 and the anode channel 25 is referred to as "hydrogen circulation system channel" as well.

The circulation pump 50 may be disposed in contact with the fuel cell 10 so as to be integrated with the fuel cell 10, via a support post 55.

The fuel cell system 100 is provided with a temperature sensor 70 that detects the temperature of a pump chamber (not shown) of the circulation pump 50.

A purge channel 28 connected to the diluter 60 is branched from the gas circulation channel 27 at the point between the fuel cell 10 and the circulation pump 50. The gas discharge valve 240 is provided on the purge channel 28. While the fuel gas is circulating in the hydrogen circulation system channel, an impurity gas (nitrogen or the like) other than hydrogen mixes into the fuel gas, so that the hydrogen concentration gradually declines. As a result, the performance of the fuel cell 10 declines. Therefore, the fuel cell system 100 periodically opens the gas discharge valve 240. Then, the fuel gas is discharged into the purge channel 28. Details regarding the fuel gas discharged into the purge channel 28 will be described later.

The blower 30 is a device that supplies air as an oxidizing gas to the cathodes (not shown) of the fuel cell 10. The blower 30 is connected to the cathode channel 35 of the fuel cell 10 via an oxidizing gas supply channel 34.

The cathode channel 35 of the fuel cell 10 is also connected (at its outlet side) to an oxidizing gas discharge channel 36. The oxidizing gas after being used in the electrochemical reaction at the cathodes is discharged into the oxidizing gas discharge channel 36.

The diluter 60 is a device that dilutes the hydrogen contained in the fuel gas by mixing it with the oxidizing gas. The diluter 60 is connected to the oxidizing gas discharge channel 36, the purge channel 28, and a mixture gas discharge channel 45. The diluter 60 is divided into two chambers by a flow plate 61 that is made of a porous ceramic, that is, the diluter 60 has a residence chamber 62 that the fuel gas from the purge channel 28 flows into and resides in, and a dilution chamber 63 that the oxidizing gas from the oxidizing gas discharge channel 36 flows into.

When the gas discharge valve 240 is opened, the fuel gas flowing in the gas circulation channel 27 flows through the purge channel 28 into the residence chamber 62 of the diluter 60, and resides therein. On the other hand, the oxidizing gas that has flown into the dilution chamber 63 of the diluter 60 passes directly through the dilution chamber 63, and is discharged to the outside via the mixture gas discharge channel 45. At this time, the fuel gas residing in the residence chamber 62 is gradually drawn into the dilution chamber 63 via the porous flow plate 61 due to the passage of the oxidizing gas, and mixes with the oxidizing gas in the dilution chamber 63. In consequence, a mixture gas of the fuel gas and the oxidizing gas flows out of the dilution chamber 63 of the diluter 60, and is discharged to the outside of the fuel cell system 100 via the mixture gas discharge channel 45. In this manner, the hydrogen in the fuel gas circulating in the hydrogen circulation system channel is diluted with the oxidizing gas, and is discharged to the outside of the fuel cell system 100.

The control circuit 400 is constituted as a logic circuit that includes a microcomputer as a main component. Specifically, the control circuit 400 includes a CPU (not shown) that executes predetermined computations and the like following pre-set control programs, a ROM (not shown) in which control programs, control data, etc. that are needed in order for the CPU to execute various computation processes are pre-stored, a RAM (not shown) in which various data needed for the CPU to perform various computation processes is written and read on a temporary basis, an input/output port (not shown) that inputs and outputs various signals, etc. The control circuit 400 performs various controls regarding the fuel cell system 100, concretely, regarding the blower 30, the circulation pump 50, the hydrogen shut-off valve 200, the gas discharge valve 240, etc.

The control circuit 400 functions as a pump control portion 410, a temperature detection portion 420, a valve control portion 430, a blower control portion 440, and a breakdown determination portion 450, and executes a pump breakdown detection process described later. The temperature detection portion 420 detects the temperature of the circulation pump 50 (the pump chamber thereof) from the temperature sensor 70.

The fuel cell system 100 of this embodiment executes the pump breakdown detection process that detects a breakdown of the circulation pump 50, when the system is started. This process will be described hereinafter.

A2. Pump Breakdown Detection Process

FIG. 2 is a flowchart of the pump breakdown detection process performed by the fuel cell system 100 of the embodiment. A precondition at the time of starting the pump breakdown detection process is that the hydrogen shut-off valve 200 and the gas discharge valve 240 are both closed, and the blower 30 and the circulation pump 50 are not being driven, that is, the fuel cell 10 is not in a power generating state.

Firstly, the pump control portion 410 sends a drive signal V that drives the circulation pump 50, to the circulation pump 50 (step S10). Upon receiving the drive signal V, the circulation pump 50 is driven on the basis of the signal, if the circulation pump 50 is normal.

Next, the pump control portion 410 judges whether or not the circulation pump 50 is driven, concretely, whether or not the circulation pump 50 is rotating at or above a predetermined rotation speed a (step S20). The predetermined rotation speed a is determined on the basis of a concrete design of the fuel cell system 100, and may be, for example, "1".

If the pump control portion 410 judges that the circulation pump 50 is rotating at or above the predetermined rotation speed a (YES in step S20), the breakdown determination portion 450 determines that the circulation pump 50 is being driven normally (step S200), and then ends this process. Incidentally, after this, the control circuit 400 may, for example, start power generation by driving the blower 30 and opening the hydrogen shut-off valve 200.

On the other hand, if the pump control portion 410 judges that the circulation pump 50 is not rotating at or above the predetermined rotation speed a (NO in step S20), the temperature detection portion 420 detects the temperature of the circulation pump 50 (the pump chamber thereof) (hereinafter, referred to as "circulation pump temperature Tp1") from the temperature sensor 70 (step S30). On this occasion, the pump control portion 410 stops sending the drive signal V.

Then, the temperature detection portion 420 judges whether or not the circulation pump temperature Tp1 is below the melting point of water (about 0° C.) (step S40). The indication of the melting point of water being "about 0° C." is based on consideration of the fact that the melting point changes depending on the pressure state.

If the temperature detection portion 420 judges that the circulation pump temperature Tp1 is not below the melting point of water (about 0° C.) (NO in step S40), the breakdown determination portion 450 determines that the circulation pump 50 has a breakdown (step S100) since the circulation pump 50 fails to be driven although the circulation pump 50 (the pump chamber thereof) is not frozen. Then, the process ends. After that, the control circuit 400 may, for example, perform a process of prohibiting the power generation of the fuel cell 10, or the like.

On the other hand, if the temperature detection portion 420 judges that the circulation pump temperature Tp1 is below the melting point of water (about 0° C.) (YES in step S40), the control circuit 400 judges that the circulation pump 50 is frozen and cannot be driven, and causes the power generation by the fuel cell 10 (step S50). Concretely, the valve control portion 430 opens the hydrogen shut-off valve 200, and performs the open-close control of the gas discharge valve 240 so that the supply amount of the fuel gas supplied to the anode channel 25 does not become less than or equal to a predetermined value β. Furthermore, the blower control portion 440 drives the blower 30 so as to supply an amount of the oxidizing gas that corresponds to the supply amount of the fuel gas, to the cathodes of the fuel cell 10. In this manner, the power generation by the fuel cell 10 is performed. Therefore, as the power generation progresses, the temperature of the fuel cell 10 heightens, and the circulation pump 50 (the pump chamber thereof) disposed in contact with the fuel cell 10 is warmed up to relatively high temperature. On this occasion, the fuel gas discharged from the purge channel 28 is diluted by the diluter 60, and is discharged to the outside of the fuel cell system 100. It is appropriate if the predetermined value β be set at a numerical value that allows the fuel cell 10 to sufficiently warm up the circulation pump 50. The predetermined value β is determined on the basis of a concrete design of the fuel cell system 100. Furthermore, the frequency of opening the gas discharge valve 240 is also determined on the basis of the predetermined value β.

Thus, when power generation is performed by the fuel cell 10, the amount of the fuel gas supplied to the anodes of the fuel cell 10 is increased by opening the hydrogen shut-off valve 200, and the oxidizing gas is supplied to the cathodes of the fuel cell 10 corresponding to the supply amount of the fuel gas. In this manner, the amount of power generation of the fuel cell 10 can be increased, and the circulation pump 50 can be quickly warmed up.

When the power generation of the fuel cell 10 is started, the temperature detection portion 420 detects the temperature of the circulation pump 50 (the pump chamber thereof) (hereinafter, referred to as "circulation pump temperature Tp2") from the temperature sensor 70 (step S60), and judges whether or not the circulation pump temperature Tp2 is higher than or equal to the melting point of water (about 0° C.) (step S70). If the temperature detection portion 420 judges that the detected circulation pump temperature Tp2 is not higher than or equal to the melting point of water (about 0° C.) (NO in step S70), the process returns to step S60.

If the temperature detection portion 420 judges that the circulation pump temperature Tp2 is higher than or equal to the melting point of water (about 0° C.) (YES in step S70), the pump control portion 410 sends the drive signal V that drives the circulation pump 50, to the circulation pump 50 again (step S80).

Then, the pump control portion 410 judges whether or not the circulation pump 50 has been driven, concretely, whether or not the circulation pump 50 is rotating at or above the predetermined rotation speed a (step S90).

If the pump control portion 410 judges that the circulation pump 50 is rotating at or above the predetermined rotation speed a (YES in step S90), the breakdown determination portion 450 determines that the reason why the circulation pump 50 was not be driven (NO in step S20) although the pump control portion 410 sent the drive signal V (step S10) to attempt to drive the circulation pump 50 is that the circulation pump 50 was frozen, and determines that the circulation pump 50 is normally drivable (step S200). After that, this process ends. Then, for example, the control circuit 400 may start power generation by the fuel cell 10.

On the other hand, if the pump control portion 410 judges that the circulation pump 50 is not rotating at or above the predetermined rotation speed a (NO in step S90), the breakdown determination portion 450 determines that the circulation pump 50 has a breakdown since the circulation pump 50 fails to be driven although the circulation pump 50 (the pump chamber thereof) is not frozen due to the warmup (step S100). Then, this process ends. Incidentally, at the end of the process, the power generation may be stopped in the case where the power generation of the fuel cell 10 was performed in the process of step S50. On this occasion, the pump control portion 410 stops sending the drive signal V.

As described above, in the fuel cell system 100, if the circulation pump 50 fails to be driven and the temperature of the circulation pump 50 (the pump chamber thereof), that is, the circulation pump temperature Tp1, is below the melting point of water (about 0° C.), the power generation by the fuel cell 10 is started to warm up the circulation pump 50 so that the temperature of the circulation pump 50 (the pump chamber thereof) becomes higher than or equal to the melting point of water (about 0° C.), and after that, the driving of the circulation pump 50 is attempted again. This makes it possible to accurately determine whether the circulation pump 50 is normal, or actually has a breakdown, even in the case where the circulation pump 50 is frozen.

Furthermore, in the fuel cell system 100, the circulation pump 50 is disposed so as to contact the fuel cell 10. During the pump breakdown detection process, power generation is performed by the fuel cell 10 so that heat produced thereby warms up the circulation pump 50. This makes it possible to warm up the circulation pump 50 by using a device provided in the fuel cell system 100. Therefore, the number of component parts of the fuel cell system 100 can be minimized. Furthermore, since the circulation pump 50 is in contact with the fuel cell 10, heat produced in the fuel cell 10 is quickly transferred to the circulation pump 50, and therefore the circulation pump can be rapidly warmed up.

In the invention, the hydrogen tank 20 corresponds to a fuel gas supply portion, and the gas circulation channel 27 corresponds to a fuel gas circulation channel. Furthermore, the gas discharge valve 240 corresponds to a shut-off valve. The pump control portion 410 corresponds to a pump control portion. The temperature detection portion 420 corresponds to a temperature detection portion. The valve control portion 430 corresponds to a valve control portion. The blower control portion 440 corresponds to an oxidizing gas adjustment portion. The breakdown determination portion 450 corresponds to a breakdown determination portion. The blower 30 corresponds to an oxidizing gas supply portion. Still further, the blower 30, the hydrogen tank 20, the hydrogen shut-off valve 200, the control circuit 400 and the fuel cell 10 correspond to warmup portion.

B. Modifications

The invention is not limited to the foregoing embodiment, but can be carried out in various manners without departing from the spirit of the invention.

B1. Modification 1

Although in the fuel cell system 100 of the foregoing embodiment, the circulation pump 50 is disposed so as to be in contact with the fuel cell 10, this does not limit the invention. The circulation pump 50 does not need to be disposed in contact with the fuel cell 10, but the circulation pump 50 may be disposed at a predetermined distance from the fuel cell 10 if the distance is such that the circulation pump 50 can be warmed up by the power generation of the fuel cell 10. This modification can achieve substantially the same effects as those of the foregoing embodiment.

B2. Modification 2

Although in the fuel cell system 100 of the foregoing embodiment, the circulation pump 50 is disposed so as to be in contact with the fuel cell 10 and the circulation pump 50 is warmed up through the use of heat produced by the power generation of the fuel cell 10, this does not limit the invention. For example, the circulation pump 50 may be provided with a heat source, such as a heater or the like, whereby the circulation pump 50 will be warmed up. In this modification, it is not necessary to dispose the circulation pump 50 in contact with the fuel cell 10, and thus the degree of freedom in disposing the circulation pump 50 increases.

B3. Modification 3

Although, in the pump breakdown detection process (FIG. 2) performed by the fuel cell system 100 of the foregoing embodiment, the temperature detection portion 420 detects the circulation pump temperature Tp1 directly from the circulation pump 50 in the process of step S30, this does not limit the invention. For example, the temperature detection portion 420 may detect the atmospheric temperature outside the fuel cell system 100, and may estimate the temperature of the circulation pump 50 from the atmospheric temperature. Furthermore, the temperature detection portion 420 may estimate the temperature of the circulation pump 50 from the temperature of a predetermined portion (e.g., the fuel cell 10) within the fuel cell system 100.

Furthermore, for example, the temperature detection portion 420 detects the circulation pump temperature Tp2 directly from the circulation pump 50 in the process of step S60. However, this does not limit the invention. For example, the temperature detection portion 420 may detect the duration of power generation of the fuel cell 10, and may estimate the temperature of the circulation pump 50 by taking into account the power generation duration together with the supply amount of the fuel gas, the atmospheric temperature outside the fuel cell system 100, etc. This modification eliminates the need to provide the temperature sensor 70, and therefore can reduce the number of component parts.

B4. Modification 4

The fuel cell system 100 of the foregoing embodiment, during the pump breakdown detection process (FIG. 2), sends the drive signal V to the circulation pump 50 (step S80) after the circulation pump temperature Tp2 becomes higher than or equal to the melting point of water due to the power generation of the fuel cell 10 (YES in step S70). In that case, if the circulation pump 50 is not rotating at or above the predetermined rotation speed α, it is determined that the circulation pump 50 has a breakdown. However, this does not limit the invention. For example, in the pump breakdown detection process of FIG. 2, the process of step S60 to step S90 may be omitted, and the following process may be performed instead.

That is, after the control circuit 400 starts the power generation by the fuel cell 10 (step S50), the pump control portion 410 sends the drive signal V to the circulation pump 50 (step S60A). Next, the pump control portion 410 judges whether or not the circulation pump 50 has been driven, concretely, whether or not the circulation pump 50 is rotating at or above the predetermined rotation speed a (step S70A). If the pump control portion 410 judges that the circulation pump 50 is rotating at or above the predetermined rotation speed a (YES in step S70A), the breakdown determination portion 450 determines that the circulation pump 50 is normally drivable (step S200).

On the other hand, if the pump control portion 410 judges that the circulation pump 50 is not rotating at or above the predetermined rotation speed a (NO in step S70A), the temperature detection portion 420 subsequently detects the circulation pump temperature Tp2 (step S80A), and judges whether or not the circulation pump temperature Tp2 is higher than or equal to the melting point of water (about 0° C.) (step S90A). If the temperature detection portion 420 judges that the detected circulation pump temperature Tp2 is not higher than or equal to the melting point of water (about 0° C.) (NO in step S90A), the process returns to step S60A.

If the temperature detection portion 420 judges that the circulation pump temperature Tp2 is higher than or equal to the melting point of water (about 0° C.) (YES in step S90A), the breakdown determination portion 450 determines that the circulation pump 50 has a breakdown (step S100) since the circulation pump 50 fails to be driven although the circulation pump 50 (the pump chamber thereof) is not frozen due to the warmup. Then, this process ends. The modification as described above also achieves substantially the same effects as those of the foregoing embodiment.

B5. Modification 5

Although in the foregoing embodiment, the various portions of the control circuit 400 are provided as software, they may be provided as hardware. Furthermore, portions provided as hardware in the foregoing embodiment may be provided as software.

The invention claimed is:

1. A fuel cell system comprising:
   a fuel cell;
   a fuel gas supply portion;
   a fuel gas supply channel that supplies a fuel gas from the fuel gas supply portion to the fuel cell;
   a fuel gas circulation channel that is connected to the fuel cell and to the fuel gas supply channel and that circulates the fuel gas discharged from the fuel cell by returning the fuel gas to the fuel gas supply channel for reuse;
   a circulation pump provided on the fuel gas circulation channel so as to circulate the fuel gas;
   a temperature detection portion programmed to detect a temperature of the fuel cell system;
   a pump control portion programmed to drive the circulation pump; and
   a breakdown determination portion programmed to determine whether the circulation pump has a breakdown,
   wherein the breakdown determination portion is programmed to determine that the circulation pump has a breakdown if the temperature of the fuel cell system detected by the temperature detection portion is higher than or equal to a melting point of water and a rotation speed of the circulation pump driven by the pump control portion is less than a predetermined rotation speed.

2. The fuel cell system according to claim 1, further comprising:
   a warmup portion that warms up the circulation pump,
   wherein when fuel cell system is started, the warmup portion warms the circulation pump if the temperature of the fuel cell system detected by the temperature detection portion is less than the melting point of water.

3. The fuel cell system according to claim 2, further comprising an oxidizing gas supply portion that supplies an oxidizing gas to the fuel cell,
   wherein if the temperature of the fuel cell system detected by the temperature detection portion is less than the melting point of water, the warmup portion causes the fuel gas supply portion and the oxidizing gas supply portion to supply the fuel gas and the oxidizing gas, respectively, to the fuel cell so as to cause the fuel cell to perform power generation so that the circulation pump is warmed by heat produced by the power generation.

4. The fuel cell system according to claim 3, wherein the circulation pump is disposed near the fuel cell.

5. The fuel cell system according to claim 4, wherein the circulation pump is disposed integrally with the fuel cell.

6. The fuel cell system according to claim 5, further comprising:
a purge channel that discharges the fuel gas to outside the fuel cell system from the fuel gas circulation channel upstream of a position where the circulation pump is provided, in a circulating direction of the fuel gas;
a shut-off valve provided on the purge channel;
a valve control portion programmed to perform an open-close control of the shut-off valve; and
an oxidizing gas adjustment portion programmed to adjust a supply amount of the oxidizing gas supplied by the oxidizing gas supply portion to the fuel cell,
wherein the warmup portion, when causing the fuel cell to perform the power generation, increases an amount of power generation of the fuel cell by causing the valve control portion to open the shut-off valve so as to increase the supply amount of the fuel gas supplied to the fuel cell and causing the oxidizing gas adjustment portion to increase the supply amount of the oxidizing gas corresponding to the supply amount of the fuel gas.

7. The fuel cell system according to claim 6, further comprising:
an oxidizing gas discharge channel that discharges the oxidizing gas to outside the fuel cell system;
a diluter that is connected to the purge channel and to the oxidizing gas channel, and that dilutes hydrogen contained in the fuel gas by mixing the fuel gas with the oxidizing gas; and
a mixture gas discharge channel that discharges a mixture gas from the diluter.

8. The fuel cell system according to claim 5, further comprising:
a purge channel that discharges the fuel gas to outside the fuel cell system from the fuel gas circulation channel upstream of a position where the circulation pump is provided, in a circulating direction of the fuel gas;
a shut-off valve provided on the purge channel;
a valve control portion programmed to perform an open-close control of the shut-off valve; and
an oxidizing gas adjustment portion programmed to adjust a supply amount of the oxidizing gas supplied by the oxidizing gas supply portion to the fuel cell,
wherein the warmup portion, when causing the fuel cell to perform the power generation, increases an amount of power generation of the fuel cell by causing the valve control portion to open the shut-off valve so as to increase the supply amount of the fuel gas supplied to the fuel cell and causing the oxidizing gas adjustment portion to increase the supply amount of the oxidizing gas corresponding to the supply amount of the fuel gas.

9. The fuel cell system according to claim 8, further comprising:
an oxidizing gas discharge channel that discharges the oxidizing gas to outside the fuel cell system;
a diluter that is connected to the purge channel and to the oxidizing gas channel, and that dilutes hydrogen contained in the fuel gas by mixing the fuel gas with the oxidizing gas; and
a mixture gas discharge channel that discharges a mixture gas from the diluter.

10. The fuel cell system according to claim 3, wherein the circulation pump is disposed integrally with the fuel cell.

11. The fuel cell system according to claim 10, further comprising:
a purge channel that discharges the fuel gas to outside the fuel cell system from the fuel gas circulation channel upstream of a position where the circulation pump is provided, in a circulating direction of the fuel gas;
a shut-off valve provided on the purge channel;
a valve control portion programmed to perform an open-close control of the shut-off valve; and
an oxidizing gas adjustment portion programmed to adjust a supply amount of the oxidizing gas supplied by the oxidizing gas supply portion to the fuel cell,
wherein the warmup portion, when causing the fuel cell to perform the power generation, increases an amount of power generation of the fuel cell by causing the valve control portion to open the shut-off valve so as to increase the supply amount of the fuel gas supplied to the fuel cell and causing the oxidizing gas adjustment portion to increase the supply amount of the oxidizing gas corresponding to the supply amount of the fuel gas.

12. The fuel cell system according to claim 11, further comprising:
an oxidizing gas discharge channel that discharges the oxidizing gas to outside the fuel cell system;
a diluter that is connected to the purge channel and to the oxidizing gas channel, and that dilutes hydrogen contained in the fuel gas by mixing the fuel gas with the oxidizing gas; and
a mixture gas discharge channel that discharges a mixture gas from the diluter.

13. The fuel cell system according to claim 3, further comprising:
a purge channel that discharges the fuel gas to outside the fuel cell system from the fuel gas circulation channel upstream of a position where the circulation pump is provided, in a circulating direction of the fuel gas;
a shut-off valve provided on the purge channel;
a valve control portion to perform an open-close control of the shut-off valve; and
an oxidizing gas adjustment portion programmed to adjust a supply amount of the oxidizing gas supplied by the oxidizing gas supply portion to the fuel cell,
wherein the warmup portion, when causing the fuel cell to perform the power generation, increases an amount of power generation of the fuel cell by causing the valve control portion to open the shut-off valve so as to increase the supply amount of the fuel gas supplied to the fuel cell and causing the oxidizing gas adjustment portion to increase the supply amount of the oxidizing gas corresponding to the supply amount of the fuel gas.

14. The fuel cell system according to claim 13, further comprising:
an oxidizing gas discharge channel that discharges the oxidizing gas to outside the fuel cell system;
a diluter that is connected to the purge channel and to the oxidizing gas channel, and that dilutes hydrogen contained in the fuel gas by mixing the fuel gas with the oxidizing gas; and
a mixture gas discharge channel that discharges a mixture gas from the diluter.

15. The fuel cell system according to claim 4, further comprising:
a purge channel that discharges the fuel gas to outside the fuel cell system from the fuel gas circulation channel upstream of a position where the circulation pump is provided, in a circulating direction of the fuel gas;

a shut-off valve provided on the purge channel;

a valve control portion programmed to perform an open-close control of the shut-off valve; and an oxidizing gas adjustment portion programmed to adjust a supply amount of the oxidizing gas supplied by the oxidizing gas supply portion to the fuel cell, wherein the warmup portion, when causing the fuel cell to perform the power generation, increases an amount of power generation of the fuel cell by causing the valve control portion to open the shut-off valve so as to increase the supply amount of the fuel gas supplied to the fuel cell and causing the oxidizing gas adjustment portion to increase the supply amount of the oxidizing gas corresponding to the supply amount of the fuel gas.

16. The fuel cell system according to claim 15, further comprising:

an oxidizing gas discharge channel that discharges the oxidizing gas to outside the fuel cell system;

a diluter that is connected to the purge channel and to the oxidizing gas channel, and that dilutes hydrogen contained in the fuel gas by mixing the fuel gas with the oxidizing gas; and a mixture gas discharge channel that discharges a mixture gas from the diluter.

17. The fuel cell system according to claim 1, wherein the temperature detection portion is programmed to detect a temperature of the circulation pump of the fuel cell system.

18. The fuel cell system according to claim 17, wherein the temperature detection portion is programmed to estimate the temperature of the circulation pump from an atmospheric temperature.

19. The fuel cell system according to claim 1, wherein if the breakdown determination portion determines that the circulation pump has the breakdown in a case in where power generation of the fuel cell is performed, the power generation of the fuel cell is stopped and the pump control portion stops driving the circulation pump.

\* \* \* \* \*